United States Patent [19]

Oda et al.

[11] 4,065,366

[45] Dec. 27, 1977

[54] PROCESS FOR PRODUCING ALKALI METAL HYDROXIDE

[75] Inventors: Yoshio Oda; Manabu Suhara; Eiji Endo, all of Yokohama, Japan

[73] Assignee: Asahi Glass Co., Ltd., Tokyo, Japan

[21] Appl. No.: 728,017

[22] Filed: Sept. 29, 1976

[30] Foreign Application Priority Data

Oct. 17, 1975  Japan .................................. 50-124275

[51] Int. Cl.$^2$ .......................... C25B 1/16; C25B 1/26; C25B 13/08

[52] U.S. Cl. ...................................... 204/98; 204/128; 204/296

[58] Field of Search .......................... 204/98, 296, 128

[56] References Cited

U.S. PATENT DOCUMENTS

| 3,657,104 | 4/1972 | Hodgdon | 204/296 |
| 3,887,499 | 6/1975 | Hodgdon | 204/296 |
| 3,904,496 | 9/1975 | Harke et al. | 204/296 |

*Primary Examiner*—R. L. Andrews
*Attorney, Agent, or Firm*—Oblon, Fisher, Spivak, McClelland & Maier

[57] ABSTRACT

In a process for producing an alkali metal hydroxide which comprises electrolysis of an aqueous solution of an alkali metal chloride in an electrolytic cell having an anode compartment and a cathode compartment which are partitioned by a fluorinated cation exchange membrane, the improvement which comprises a fluorinated cation exchange membrane made of a fluorinated copolymer having carboxylic acid groups as the ion exchange group and having an ion exchange capacity of 0.5 to 2.0 meq/g dry polymer and a concentration of carboxylic acid groups of 8 to 30 meq/g water absorbed by the membrane when contacted with an aqueous solution of the alkali metal hydroxide having about the same concentration of alkali metal hydroxide as that of catholyte during said electrolysis.

10 Claims, No Drawings

PROCESS FOR PRODUCING ALKALI METAL HYDROXIDE

DETAILED DESCRIPTION OF THE INVENTION:

The present invention relates to a process for producing an alkali metal hydroxide and chlorine by a diaphragm electrolysis of an aqueous solution of an alkali metal chloride.

More particularly, it relates to a novel process for producing an alkali metal hydroxide in high concentration and high purity by a diaphragm electrolysis of an aqueous solution of an alkali metal chloride with a diaphragm of a fluorinated cation exchange membrane which has specific characteristics.

It has been known to provide a diaphragm electrolysis of an aqueous solution of sodium chloride in two compartments wherein an anode and a cathode in an electrolytic cell are partitioned with a diaphragm and an aqueous solution of sodium chloride is fed into the anode compartment to electrolyze it to produce sodium hydroxide in the cathode compartment.

Heretofore, asbestos has been usually used as a diaphragm. When asbestos diaphragm is used as a diaphragm, the asbestos itself is corroded by the electrolyte whereby the asbestos diaphragm can not be used for a long time and the life is short. Moreover, the diaphragm is porous to pass the electrolytic solution through it whereby sodium chloride contaminated resulting sodium hydroxide to cause low purity.

In order to prolong the life of the diaphragm so as to use it for a long time, it has been proposed to use an asbestos diaphragm impregnated with a fluorinated resin which has hydrophylic group and alkali resistance, or a diaphragm made of the fluorinated resin which has hydrophylic group and alkali resistance. (US Pat. Nos. 3,853,720 and US Pat. No. 3,853,721)

These diaphragms are also porous to pass the electrolyte whereby the purity of soduim hydroxide is low and the current efficiency can not be maintained in satisfactory high level when the concentration is high. It has been proposed to use cation exchange membranes which selectively pass only alkali metal ions without substantially passing the electrolyte as the diaphragm.

It has been proposed to preferably use fluorinated cation exchange membranes which have high alkali resistance and chlorine resistance. (US Pat. No.3,773,634 and US Pat. No. 3,853,135)

When these fluorinated cation exchange membranes are used as the diaphragm, the electrolyte does not substantially passed through them and only alkali metal ions selectively pass through them, whereby the contamination of the alkali metal chloride in the resulting alkali metal hydroxide can be prevented to obtain the product having desired purity.

However, the current efficiency in the electrolysis has not been satisfactory. When a cation exchange membrane made of a copolymer of $C_2F_4$ and $CF_2 = CFOCF_2CF . (CF_3)OCF_2CF_2SO_2F$ is used, the current efficiency can not be maintained to higher than 85% in the case of higher than 20% of the concentration of sodium hydroxide, though it may be attained in the case of low concentration of sodium hydroxide.

When the concentration of sodium hydroxide is higher than 40%, the current efficiency is 50 to 70%. (US Pat. No. 3,773,634)

The inventors have studied to produce an alkali metal hydroxide in high purity and high concentration with high current efficiency be an electrolysis of an alkali metal chloride by using a cation exchange membrane as a diaphragm.

The inventors have found that the object can be attained by using a fluorinated cation exchange membrane which has carboxylic acid groups as the ion exchange groups to give specific ion exchange capacity and a specific concentration of the carboxylic acid groups on the basis of water absorbed in the membrane.

The inventors have also found that when the fluorinated cation exchange membrane has a specific glass transition temperature, the production of an alkali metal hydroxide is further improved.

It is an object of the present invention to provide a process for producing an alkali metal hydroxide having high purity in high current efficiency by an electrolysis of an aqueous solution of an alkali metal chloride by using a fluorinated cation exchange membrane having charactersistic as a diaphragm for partitioning an anode compartment and a cathode compartment in an electrolytic cell.

Another object of the invention is to provide desired conditions for electrolysis of an alkali metal chloride in the process for producing an alkali metal hydroxide having high purity in high current efficiency by using a specific fluorinated cation exchange membrane.

The other object of the invention is to provide fluorinated copolymers for the preparation of the fluorinated cation exchange membranes.

These objects of the invention have been attained by using a fluorinated cation exchange membrane which is made of a polymer produced by copolymerizing a fluorinated olefin monomer and a comonomer having carboxylic acid group or a functional group being convertible to carboxylic acid group and has an ion-exchange capacity of 0.5 to 2.0 meq/g dry polymer and a concentration of the carboxylic acid group of 8 to 30 meq/g water absorbed in the membrane in an aqueous alkali metal hydroxide at the same concentration as that of the catholyte in the electrolysis, as the diaphragm in the process for producing an alkali metal hydroxide by a diaphragm electrolysis of an aqueous solution of an alkali metal chloride.

It is especially preferable to use the fluorinated cation exchange membrane having the glass transition temperature to be at least 20° C below the temperature in the electrolysis.

In accordance with the invention, the resulting alkali metal hydroxide has high purity and as shown in the following examples, the current efficiency can be higher than 90% even though the concentration of the alkali metal hydroxide is higher than 40%. The effect is remarkable in comparison with the process using a conventional fluorinated cation exchange membrane made of $C_2F_4$ and $CF_2 = CFOCF_2CF(CF_3)OCF_2CF_2SO_2F$. It has been considered that cation exchange membranes having carboxylic acid groups can not be used in an acidic condition since the dissociation of the ion exchange groups is only caused in alkaline condition. In the case of the electrolysis in the two compartments system, the pH of the anode compartment is in an acidic condition. Accordingly, as a common knowledge, carboxylic acid type ion exchange membranes may be difficult to use for the object because of poor-dissociation of the ion exchange groups and high electric resistance. Accordingly, sulfonic acid type cation exchange membranes are preferred because they dissociate under acidic conditions. Thus, the inventors have studied and found that when the carboxylic acid type fluorinated cation exchange membranes which have the specific ion exchange capacity and the concentration of the specific ion exchange groups on the basis of water absorbed in the membrane and preferably has the specific glass transition temperature are used, the dissociation of ion exchange groups occurs and results in low electric resistance in the above-mentioned condition, and remarkably high current efficiency which could not be attained by using any sulfonic acid type cation exchange membrane can be attained even in the process for producing an alkali metal hydroxide in high concentration.

The fact was unpredictable.

The fact that an alkali metal hydroxide is obtained at concentration of higher than 40% in high current efficiency is remarkably industrial advantage.

When the alkali metal hydroxide is produced at a concentration of up to 20% in the conventional processes, it is necessary to concentrate to obtain industrial products. Accordingly, the cost of the apparatus and the operation of an evaporation are quite expensive.

In accordance with the present invention, the step of concentration can be omitted to directly obtain the product of the alkali metal hydroxide at high concentration from the electrolytic cell.

As stated above, the fluorinated cation exchange membranes used for the invention have carboxylic acid groups as the ion exchange groups and have the specific ion exchange capacity.

The ion exchange capacity should be 0.5 to 2 meq/g dry polymer (milliequivalent/gram of dry polymer). When the ion exchange capacity is less than the range, the current efficiency is not high enough in the case of high concentration of the alkali metal hydroxide. When the ion exchange capacity is more than the range, the water content of the membrane is low and the current efficiency is disadvantageously too low.

The ion exchange capacity is preferably 0.9 to 1.8 meq/g dry polymer especially 1.1 to 1.7 meq/g dry polymer, because the alkali metal hydroxide can be produced at high concentration in high current efficiency and under low cell voltage.

It is preferable to use the cation florinated exchange membrane which has the specific concentration of the ion exchange groups on the basis of water absorbed in the membrane in the aqueous solution of the alkali metal hydroxide at the same concentrations as that of catholyte in the electrolysis.

It is a novel finding of the relationship between the electrolytic characteristics and the concentration of the ion exchange on the basis of water absorbed in the membrane in above condition by the inventors.

According to the studies, the behaviour of the fluorinated cation exchange membrane in the electrolysis seems to be remarkably different on the surface in the anode compartment and on the surface in the cathode compartment.

The surface in the anode compartment which contacts to the acidic solution, seems to be swollen.

The surface in the cathode compartment, which contacts to the aqueous solution of the alkali metal hydroxide at high concentration, seems to be contracted.

The characteristics of the membrane in the electrolysis are highly affected by the concentration of the alkali metal hydroxide contacted to the surface of the membrane. In order to attain excellent electrolytic characteristics, it is found that the membrane should have the specific concentration of ion exchange groups on the basis of water absorbed in the membrane in an aqueous solution of the alkali metal hydroxide at the same concentration as that of the catholyte in the electrolysis.

When the content of the ion exchange group per water content in the membrane is less than 8 meq/g or higher than 30 meq/g, the current efficiency is not satisfactory. It is unpredictable fact that when the concentration of the ion exchange groups in the membrane is too high, the current efficiency is low.

When the concentration of the ion exchange groups on the basis of water absorbed in the membranes is 10 to 28, especially 14 to 26 meq/g, the alkali metal hydroxide having high concentration can be advantageously obtained in especially high current efficiency under the low cell voltage. The cation exchange membrane of the invention preferably has the glass transition temperature which is at least 20° C lower than the temperature in the electrolysis.

According to the studies, when the glass transition temperature of the fluorinated cation exchange is higher than the temperature of the electrolysis or is not more than 20° C lower than the temperature of the electrolysis, the cell voltage is high and the current efficiency is low in the electrolysis.

The decrease of the current efficiency is remarkable in the case of high concentration of the alkali metal hydroxide in the process for producing it.

Accordingly, it is advantageous to use the membrane having the specific glass transition temperature.

The glass transition temperature of the fluorinated cation exchange membrane is preferably at least 30° C, lower than the temperature of the electrolysis.

The glass transition temperature is usually lower than 70° C, especially 50° C.

On the other hand, the lower limit of the glass transition temperature is not critical. However, when the glass transition temperature is too low, the tensile strength of the membrane is low, and accordingly, it is suitable to be higher than $-80°$ C.

It is not necessarily clear why the electrolytic characteristics are affected by the concentration of the ion exchange groups on the basis of water absorbed in the membrane and the glass transition temperature. Even though the reason is not cear, the effect of these physical properties on the characteristics of the membrane is remarkable.

The concentration of the ion exchange groups and the glass transition temperature are dependent upon the kind of the copolymer for the membrane, the crosslinked degree, molecular weight, ion-exchange capacity and intermolecule cohesive force of the copolymer. For instance, when a copolymer of $C_2F_4$ and perfluoro methacrylic acid is used, if the crosslinked degree is high or the ion exchange capacity is too small, the glass transition temperature of the membrane is disadvantageously higher than the temperature of the electrolysis of 40° to 100° C as stated below. The fluorinated cation exchange membranes of the invention are made of copolymers produced by copolymerizing a fluorinated olefin and a comonomer having carboxylic acid group or a functional group which can be converted to carboxylic acid group.

The graft polymers produced by graft-polymerizing a monomer having carboxylic acid group or the convertible functional group on a homopolymer of fluorinated olefin, are not suitable as the characteristics are inferior even though the ion exchange capacity is in the above-mentioned range.

The membrane made of the graft polymers have non-uniform distribution of the ion exchange groups even though the ion exchange capacity is the same, whereby the ion exchange groups in the membrane exists nonuniformly to give locally high ion exchange capacity.

The fluorinated olefin monomers and the comonomers havng carboxylic acid group or a functional group which can be converted to carboxylic acid group for using the production of the copolymer for the membranes can be selected from the defined groups.

It is preferable to use monomers for forming the units (a) and (b) in the copolymers.

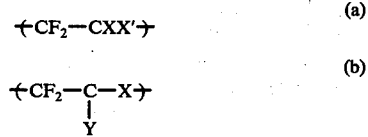

wherein X represents —F, —Cl, —H or —CF$_3$ and X' represents —F, —Cl, —H, —CF$_3$ or CF$_3$(CF$_2$)$_m$—; $m$ represents an integar of 1 to 5 and Y represents —A, —$\phi$—A, —P—A, —O—(CF$_2$)$_n$(P, Q, R - A; P represents —CF$_2$)$_a$(CXX')$_b$(CF$_2$)$_c$; Q represents —CF$_2$-O-CXX')$_d$, R represents — CXX'—O—CF$_2$)$_e$; (P,Q,R) represents a discretional arrangement of at least one of P, Q and R; $\phi$ represents phenylene group; X,X' are defined above; $n$ = 0 to 1; $a$, $b$, $c$, $d$ and $e$ represent 0 to 6; A represents —COOH or a functional group which can be converted to —COOH by hydrolysis or neutralization such as — CN, — COF, — COOR, — COOM, — CONR$_2$R$_3$; R$_1$ represents a C$_{1-10}$ alkyl group; M represents an alkali metal or a quaternary ammonium group and R$_2$ and R$_3$ respectively represent hydrogen atom or a C$_{1-10}$ alkyl group.

The typical groups of Y have the structure having A connected to carbon atom which is connected to fluorine atom, and include

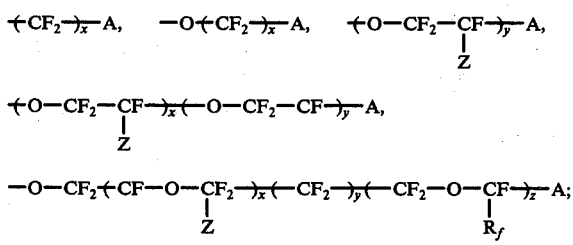

wherein $x$, $y$ and $z$ respectively 1 to 10; Z and R$_f$ respectively represent —F and a C$_{1-10}$ perfluoroalkyl group and A is defined above. In the case of the copolymers having the units (a) and (b), it is preferable to have 1 to 40, especially 3 to 20 mole % of the units (b) in order to produce the membrane having an ion-exchange capacity in said range. The molecular weight of the fluorinated copolymer is important because it relates to the tensile strength, the fabricapability, the water permeability and the electrical properties of the resulting fluorinated cation exchange membrane.

It is preferable to use the fluorinated copolymer having a molecular weight to give the volumetric melt flow rate of 100 mm$^3$/second at 150° to 300° C preferably 160° to 270° C.

When the molecular weight is higher than said range, it is hard to fabricate to a membrane having uniform thickness on the industrial scale. In the production of the copolymer, it is possible to improve the property of the membrane by using more than one monomer or adding a third component of monomer.

Thus, it is possible to impart flexibility to the membrane by adding CF$_2$=CFOR$_f$(R$_f$: a C$_{1-10}$ perfluoroalkyl group) or to impart high mechanical strength to the membrane under the coosslinkage of the copolymer by adding CF$_2$ = CF—CF = CF$_2$, CF$_2$ = CFO(CF$_2$)$_{1-4}$OCF = CF$_2$, etc.

The copolymerization of the fluorinated olefin monomer with a polymerizable monomer having carboxylic acid group or a functional group which can be converted to carboxylic acid group and a third component of monomer, can be attained by conventional desirable methods.

That is, the polymerization can be attained by a catalytic polymerization, a thermal polymerization, a radiation-induced polymerization, etc. if necessary using a solvent such as halogenated hydrocarbons.

The fabrication to the membrane by using the resulting copolymer can be attained by conventional methods such as a press molding method, a roller molding method, an extrusion molding method, a solution flow-spreading method, a dispersion molding method, a powder molding method, etc.

Thus, it is preferable to prepare the membrane having a thickness of 20 to 500 microns especially 50 to 400 microns. When the copolymer has functional groups which can be converted to carboxylic acid group, the functional groups are converted to carboxylic acid group by a desired treatment before, during or after the fabrication to the membrane, especially after the fabrication.

When the functional groups are —CN, —COF, —COOR$_1$, —COOM or —CONR$_2$R$_3$ (M, R$_1$ to R$_3$ are defined above), the functional groups can be converted to carboxylic acid groups by a hydrolysis or neutralization with an alcoholic aqueous solution of an acid or a base. When the functional groups are double bonds, they can be converted to carboxylic acid group by reacting with COF.

The cation exchange membranes of the invention can be fabricated by blending a polyolefin such as polyethylene, polypropyrene; or a fluorinated polymer such as polytetrafluoroethylene, copolymer of ethylene and tetrafluoroethylene.

It is also possible to reinforce the copolymer by a supporter made of such as said polymer in a form of cloth, net, non-woven fabric, porous film, etc..

The amount of the polymer used for blending or supporting is not considered in the determination of the ion-exchange capacity, the glass transition temperature and the volumetric melt flow rate.

A water permeability of the cation exchange membrane of the invention should be suitable value and is usually lower than 100 ml/hour/m$^2$ (at 60° C in 4N-NaCl, pH 10) preferably lower than 10 ml/hour/m$^2$. When the water permeability is high, the purity of the alkali metal hydroxide is not satisfactory because of the permeation of the electrolyte.

The electric resistance of the membrane in the electrolysis is also important factor, because it relates to the power consumption, and is preferably in a range of 0.5 to 10Ω/cm$^2$, especially 0.5 to 7Ω/cm$^2$. It is possible to employ the conventional diaphragmic electrolytic system for producing an alkali metal hydroxide by the electrolysis of an alkali metal chloride using the fluorinated cation exchange membrane.

The electrolytic voltage and the current density are respectively in a range of 2.3 to 5.5 volts and 10 to 100 A/dm², preferably 15 to 60 A/dm². The temperature of the electrolysis is in a range of 70 to 120° C preferably 80° to 100° C.

The anode used in the electrolysis can be graphite or anticorrosive electrode having stability in size which is made of a titanium substrate coated with a platinum group metal or an oxide of platinum group metal. The cathode used in the electrolysis can be iron, stainless steel, nickel, rhenium, silicon or precious metal coated thereof. The system of the electrolytic cell can be monopolar system or the bipolar system.

Thus, in the case of the two compartment cell wherein the anode compartment and the cathode compartment are formed by partitioning the anode and the cathode with the cation exchange membrane and aqueous solution of alkali metal chloride is fed in the anode compartment to electrolyze it, it is possible to produce alkali metal hydroxide having high concentration and hydrogen in cathode compartment and chlorine in anode compartment. In the invention, it spreferable to maintain pH of the anolyte to low level but higher than 1.3 by adding an acid to the anode compartment.

When the pH of the anolyte is maintained to lower than 1.3, the fluorinated cation exchange membrane having carboxylic acid groups as the ion exchange groups has high electric resistance.

It is preferable to be lower pH in the range of higher than 1.3 in the anode compartment so as to obtain chlorine having high purity.

When the pH is higher than 5, the control of the generation of oxygen on the anode is difficult to cause low purity of chlorine and to cause an accumulation of hypochlorous acid ions.

When the pH of the anolyte is especially maintained in a range of 1.8 to 3.5, the electric resistance of the membrane is not so high and chlorine having high purity can be obtained advantageously. In the invention, an acid is added to the anolyte solution to maintain the pH in the above-mentioned range.

The anolyte is slightly acidic by the dissolution of chlorine generated in the anode compartment. However, it is difficult to be high concentration of hydrogen ions as required in the invention because of a few hydroxyl ions leaked from the anode compartment.

A kind of the acid can be selected from various acids, unless causing a trouble in the electrolysis of the alkali metal chloride. Since the anion is the same as the alkali metal chloride, hydrochloric acid is preferably used.

The concentration of the alkali metal chloride which is the main component of the anolyte solution is usually in a range of 100 to 300 g/liter from the conversion and recycling rate in the electrolysis.

When the concentration of the alkali metal chloride is lower than 120g/liter, the electric water permeability is occasionally too high to produce the alkali metal hydroxide at the concentration of higher than 40%. On the other hand, when the concentration of the alkali metal chloride is higher than 260 g/liter, the rate of decomposition of alkali metal chloride is disadvantageously low. In order to produce the alkali metal hydroxide at high concentration under low cell voltage, it is preferable to give 150 to 230 g/liter of the concentration of the alkali metal chloride.

The concentration of the alkali metal chloride in the anolyte is not the concentration of the solution charged into the anode compartment but an average concentration of the alkali metal chloride in the anolyte. In the invention, it is preferable to feed water into the catholyte compartment to maintain the concentration of the alkali metal hydroxide to 20 to 45 wt.%.

In the method of feeding water into the catholyte compartment, pure water or a dilute aqueous solution of alkali metal hydroxide can be continuously or intermittently fed. The current efficiency is especially high when the concentration of the alkali metal hydroxide in the catholyte is in a range of 25 to 42 wt.%. The process of the invention is not limited to the two compartment cell system, and can be attained by using the three compartment cell or the multi compartment cell wherein an anode compartment, a cathode compartment and a middle compartment are formed by partitioning the anolyte and the catholyte by using a plurality of the cation exchange membrane or the combination with the other cation exchange membrane or the other diaphragm.

A further understanding can be obtained by reference to certain specific examples which are provided herein for purposes of illustration only and are not intended to be limiting unless otherwise specified. In the examples, an ion-exchange capacity of a cation exchange membrane is defined as follows.

A H-type cation exchange membrane was immersed into 1N-HCl at 60° C for 5 hours to completely convert it to H-type membrane, and then the membrane was washed with water so as to be free of HCl. Then 0.5 g of the H-type membrane was immersed into a solution prepared by adding 25 ml of water to 25 ml of 0.1N-NaOH to completely convert it to Na+ type membrane.

Then, the membrane was taken out and the amount of NaOH in the solution was measured by a back titration with 0.1N-HCl.

The ion-exchange capacity is referred as a amount of ion exchange groups per dry polymer ($A_1$) (meq/g dry polymer).

A concentration of the ion exchange groups on the basis of the water absorbed in the membrane ($A_2$)-(meq/g $H_2O$ in the polymer) was measured as follows.

About 0.5 g of a Na+ type cation exchange membrane was immersed into an aqueous solution of the alkali metal hydroxide at the concentration which is the same as the concentration of the alkali metal hydroxide in the catholyte solution contacted to one surface of the membrane in the electrolysis.

After immersing it at 85° C for 17 hours, the membrane was taken up and excess of the aqueous solution of the alkali metal hydroxide was removed with a filter paper to measure the weight $(W_1)_g$ of the membrane. Then the membrane was immersed in 50 ml of water to extract the alkali metal hydroxide and the amount of alkali metal hydroxide $(D_A)_{eq}$ was measured by a titration with 0.1N-HCl. Then, the membrane was dried in vacuum at 80° C for one night and the weight $(W_2)_g$ of the membrane was weighed.

The value $A_2$ was given by the following equation.

$$A_2 = \frac{A_1 \cdot W_2}{W_1 - D_A \cdot M - W_2}$$

wherein M represents equivalent of the alkali metal hydroxide (g/eq). A glass transition temperature of the cation exchange membrane was measured by using scanning type differential thermal analyzer (Model DBC-2 manufactured by Perkin-Elmer Co.) as follows.

About 10 mg of a dried methyl ester-type film sample was sealed at the center on a sample pan and was heated at a rate of 10° C/min. A volumetric melt flow rate is defined as follows. 1 g of a sample of the copolymer is extruded through a nozzle having a diameter of 1 mm and a length of 2 mm under a predetermined pressure of 30 Kg/cm² at a predetermined temperature. The volumetric melt flow rate is shown by the amount of polymer flowed in the unit of mm³/second.

EXAMPLE 1

A fluorinated cation exchange membrane was prepared by copolymerizing $C_2F_4$ and $CF_2 = CFO(CF_2)_3COOCH_3$.

Various copolymers having various molecular weights and distributions of molecular weights were produced by varying a kind of a solvent, a temperature and a pressure in the copolymerizations and the copolymers were press-molded at 180° to 240° C to form each membrane having a thickness of 100 microns. The resulting membranes were hydrolyzed in an alcoholic aqueous solution of sodium hydroxide to give Na-type ion exchange groups.

Four types of the fluorinated cation exchange membranes were obtained. Each membrane was cut into two sheets. One sheet was used for measuring the concentration of the ion exchange groups on the base of the water absorbed in the membrane and the ion exchange capacity per dry polymer.

The other sheet was used for the electrolysis for producing sodium hydroxide at a concentration of 35 wt.% in the cathode compartment of the electrolytic cell.

Two compartment type electrolytic cell was prepared by partitioning an anolyte and a catholyte with each of the four cation exchange membranes and using an anode of titanium coated with rhodium and a cathode made of stainless steel with a space of electrodes of 2.2 cm and an effective area of the membrane of 0.25 dm².

The electrolysis of sodium chloride was carried out under the following conditions.

The anode compartment was filled with 234 g/liter of aqueous solution of NaCl and the cathode compartment was filled with 35 wt.% of aqueous solution of NaOH. An aqueous solution of NaCl at 234g/liter was fed into the anode compartment at a rate of 150 cc/hour, and water was fed into the cathode compartment so as to maintain the concentration of NaOH to 35 wt.%. The temperature of the electrolysis was 85° C. The electrolysis was carried out by overflowing an aqueous solution of NaCl from the anode compartment, and overflowing an aqueous solution of NaOH from the cathode compartment under maintaining 35 wt.% of NaOH by feeding water. The current density was 20A/dm² and the temperature was kept at 85° C. The aqueous solution of NaOH was overflowed from the cathode compartment and collected. The current efficiency was measured from the amount of NaOH which was produced by the electrolysis. The content of ion exchange groups per 1 g dry polymer ($A_1$) and the concentration of the ion exchange groups on the base of the water absorbed in the membrane in 35 wt.% NaOH (which is the same concentration of the catholyte) ($A_2$), the temperature $T_Q$(° C) of giving the volumetric flow rate of 100 mm³/sec and the electrolytic characteristics are shown in Table 1.

Table 1

| Membrane No. | $A_1$ | $A_2$ | $T_Q$ | Current efficiency for production of NaOH (%) | Cell Voltage (V) |
|---|---|---|---|---|---|
| 1 | 1.22 | 8.1 | 165 | 87.3 | 4.1 |
| 2 | 1.22 | 11.9 | 173 | 89.1 | 4.2 |
| 3 | 1.20 | 15.5 | 220 | 95.0 | 4.4 |
| 4 | 1.19 | 22.3 | 245 | 92.8 | 4.6 |

REFERENCE 1

In accordance with the process of Example 1, four types of fluorinated cation exchange membranes were prepared, and $A_1$ and $A_2$ and the electrolytic characteristics were measured. The results are shown in Table 2.

Table 2

| Membrane No. | $A_1$ | $A_2$ | $T_Q$ | Current efficiency for production of NaOH (%) | Cell Voltage (V) |
|---|---|---|---|---|---|
| 5 | 1.20 | 4.5 | 130 | 63.1 | 4.0 |
| 6 | 1.22 | 6.9 | 140 | 79.9 | 4.1 |
| 7 | 1.19 | 30.7 | 280 | 84.0 | 4.8 |
| 8 | 1.18 | 33.6 | 300 | 80.2 | 5.2 |

EXAMPLE 2

In accordance with the process of Example 1, various fluorinated cation exchange membranes having various $A_1$ and $A_2$ were prepared by using the combination of the fluorinated monomers used in Example 1. In accordance with the methods of Example 1, $A_1$ and $A_2$ and the electrolytic characteristics were measured. The results are shown in Table 3.

Table 3

| Membrane No. | $A_1$ | $A_2$ | Concentration of NaOH (%) | Current efficiency for production of NaOH (%) | Cell voltage (V) |
|---|---|---|---|---|---|
| 9 | 0.90 | 19.3 | 35 | 94.3 | 4.9 |
| 10 | 1.15 | 19.0 | 35 | 93.9 | 4.5 |
| 11 | 1.35 | 18.5 | 35 | 94.0 | 4.3 |
| 12 | 0.90 | 19.1 | 20 | 95.0 | 4.6 |
| 13 | 1.30 | 14.2 | 40 | 92.3 | 4.3 |
| 14 | 1.41 | 12.6 | 40 | 91.7 | 4.2 |
| 15 | 1.42 | 14.1 | 45 | 93.2 | 4.3 |
| 16 | 1.50 | 14.8 | 45 | 90.8 | 4.2 |
| 17 | 1.62 | 13.3 | 45 | 90.1 | 4.1 |

REFERENCE 2

In accordance with the process of Example 1, similar tests to Reference 1 were conducted. The results are shown in Table 4.

Table 4

| Membrane No. | $A_1$ | $A_2$ | Concentration of NaOH (%) | Current efficiency for production of NaOH (%) | Cell voltage (V) |
|---|---|---|---|---|---|
| 18 | 0.90 | 35.6 | 45 | 77.6 | 5.7 |
| 19 | 1.42 | 6.3 | 20 | 80.2 | 4.0 |
| 20 | 1.42 | 6.5 | 25 | 81.6 | 4.0 |
| 21 | 1.30 | 30.6 | 45 | 86.2 | 4.9 |
| 22 | 1.62 | 5.4 | 20 | 78.4 | 4.0 |

EXAMPLE 3

In an autoclave made of stainless steel, trichlorotrifluoroethane, azobisisobutyronitrile and

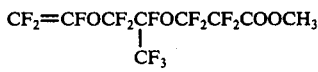

charged. The autoclave was purged with nitrogen gas, and was heated at 70° C. Then, a trifluorochloroethylene was charged to initiate the reaction.

The resulting copolymer was press-molded at 170° C to form a membrane having a thickness of 100 microns. In the electrolytic cell of Example 1 using this membrane, 4N-NaCl aqueous solution was fed into the anode compartment at a rate of 150cc/hour and water was fed into the cathode compartment at a ratio of 8g/hour and the electrolysis was carried out at 91° C under the current density of 20A/dm$^2$.

As the results, the cell voltage was 4.25 V, the concentration of sodium hydroxide was 31% and the current efficiency was 93.8%. The fluorinated cation exchange membrane had $A_1$ of 1.02 meq/g dry polymer and $A_2$ of 17.7 meq/g water in the membrane in 31% NaOH aqueous solution.

EXAMPLE 4

Fluorinated cation exchange membranes having various ion exchange capacities were produced by copolymerizing $C_2F_4$ and $CF_2 = CFO(CH_2)_3COOCH_3$ at various ratios. The resulting copolymers were press-molded at 200° C to form membranes having a thickness of 100 microns, and they were hydrolyzed in an alcoholic aqueous solution of sodium hydroxide to convert the ion exchange groups to the acid type.

The resulting fluorinated cation exchange membranes had the ion exchange capacity $A_1$ of 0.83, 0.94, 1.25 and 1.64 meq/g dry polymer and the glass transition temperature of 45° C, 35° C, 20° C and −5° C. Two compartment type electrolytic cell was prepared by using the membranes in accordance with the method of Example 1 and the electrolysis was carried out under the following conditions. The anode compartment was filled with 4N-NaCl aq. solution and the cathode compartment was filled with 12 N-NaOH aq. solution. 4N-NaCl aq. solution was fed into the anode compartment at a rate of 150cc/hour and water was fed into the cathode compartment so as to obtain about 14.4N-NaOH aq. solution from it, in the current density of 20A/dm$^2$ at the temperature of the electrolysis of 85° C. The aqueous solution of NaCl was overflowed from the anode compartment and the aqueous solution of NaOH was overflowed from the cathode compartment and collected. The current efficiency was measured from the amount of NaOH which was produced by the electrolysis.

The electrolytic characteristics given by using the fluorinated cation exchange membranes are shown in Table 5.

Table 5:

| Membrane No. | $A_1$ | $A_2$ | Concentration of NaOH (N) | Current efficiency (%) | Cell voltage V |
|---|---|---|---|---|---|
| 23 (reference) | 0.83 | 36.2 | 14.4 | 80.5 | 5.10 |
| 24 | 0.94 | 28.7 | 14.5 | 85.3 | 4.78 |
| 25 | 1.25 | 18.8 | 14.2 | 91.5 | 4.37 |
| 26 | 1.61 | 19.5 | 14.5 | 91.4 | 4.20 |

The glass transition temperature of the membranes ar in the order of No. 23 to 26. The current efficiency in the case of the membrane No. 23 was low because the membrane No. 23 had high glass transition temperature and low ion exchange capacity.

EXAMPLE 5

In 200 ml autoclave made of stainless steel, 18.8 g of trichlorofluoroethane, 80 mg of azobisisobutyronitrile and 28.5 g of

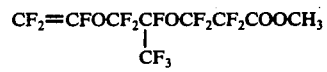

were charged.

The autoclave was purged with nitrogen gas and heated to 70° C. Then trifluorochloroethylene was charged and the reaction was initiated. After 24 hours, 5.9 g of white copolymer was obtained. The copolymer was press-molded at 170° C to form a membrane having a thickness of 100 microns and then, the membrane was hydrolyzed to obtain the fluorinated cation exchange membrane having $A_2$ of 1.02 meq/g dry polymer, $A_2$ of 16.5, the glass transition temperature of −20° C and the water permeability of 3 ml/hour/m$^2$. The electrolysis was carried out in the electrytic cell of Example 1 using the membrane by feeding 4N-NaCl aq. solution into an anode compartment at a rate of 150 cc/hour and feeding water into the cathode compartment at a rate of 8 g/hour at 91° C under the current density of 20A/dm$^2$. As the result, the cell voltage was 4.25 V, the concentration of NaOH was 10.4N and the current efficiency was 94.2 %.

EXAMPLE 6

In the electrolytic cell of Example 1 except using the fluorinated cation exchange membrane ($A_1$: 1.25 meq/g dry polymer, $A_2$: 19.5 meq/gH$_2$O), the electrolysis of an aqueous solution of potassium chloride was carried out under the following conditions. The anode compartment was filled with 3N-KCl and the catholyte compartment was filled with 8N-KOH. 3N-KCl aq. solution was fed into the anode compartment at a rate of 180 cc/hour and 0.1N-KOH aq. solution was fed into the cathode compartment at a rate of 6.0 cc/hour and the electrolysis was carried out at 85° C under the cell voltage of 3.7 V and the current density of 20A/dm$^2$ in the pH of the anolyte solution of 3.

The aqueous solution of potassium chloride was overflowed from the anode compartment and the aqueous solution of potassium hydroxide was overflowed from the cathode compartment and was collected in the normal operation. The current efficiency was measured from the amount of potassium hydroxide which is obtained in the electrolysis. As the result, 8.2N-KOH aq. solution was obtained from the cathode compartment in the current efficiency of 90.7 %.

The concentration of KCl in the product of KOH was less than 0.03 %. The electrolysis was continuously carried out for 1 month in stable. The condition of the diaphragm was examined after the operation and no abnormal condition was found.

REFERENCE 3

A fluorinated copolymer was produced by copolymerizing $C_2F_4$ and $CF_2 = CFO(CF_2)_3COOCH_3$ in the trichlorotrifluoroethane in the presence of a catalyst of azobisisobutyronitrile at 70° C. The fluorinated copolymer was admixed with calcium carbonate and the mixture was press-molded to form a membrane and the membrane was treated with hydrochloric acid aqueous solution to dissolve calcium carbonate whereby a porous diaphragm made of the fluorinated copolymer which had a thickness of 100 microns, a size of 8 cm × 8 cm, the ion exchange capacity of 1.0 meq/g dry polymer was obtained. The water permeability of the diaphragm was 168 liter/m² under the pressure of 1 m of water (60° C : 4N NaCl, pH 10 ). In accordance with the process of Example 4, the electrolytic cell was prepared by using the diaphragm and the electrolysis was carried out. Large amount of sodium chloride contaiminated the catholyte. In the case, the current efficiency was 92.1 % for producing 2.1N-NaOH aq. solution, however, about 10 % of sodium chloride was contained in the resulting product of NaOH. The purity was quite low.

REFERENCE 4

A 50 g of fine powdery polytrifluoroethylene was dipped in a methyl perfluoroester of $CF_2 = CFO(CF_2)_3COOCH_3$ and was heated at 100° C to immerse the methyl perfluoro ester in the polymer. The $\gamma$-rays of $Co^{60}$ was irradiated to the polymer at room temperature at a dose of 0.01 megarad/hour for 25 hours. The product was kept for 2 days at the same temperature and then it was washed with ethanol at 40° C and was dried. The polymer was admixed with trifluorochloroethylene telomer (20 wt. parts per 100 parts) and the mixture was heat-pressed to form a mombrane having a thickness of 300 microns. The trifluorochloroethylenetelomer was extracted with ethanol and the membrane was hydrolyzed with a mixture of 70 g of ethanol, 30 g of water and 8 g of NaOH, under refluxing to obtain the fluorinated cation exchange membrane having $A_1$ of 0.8/meq/g dry polymer and $A_2$ of 5.3 meq/gH$_2$O.

In accordance with the process of Example 4 except using the fluorinated cation exchange membrane, the electrolysis was carried out. As the result, the cell voltage was high, as 5.1 V, the current efficiency for producing 8.0N-NaOH was 52.3 %.

EXAMPLE 7

An electrolysis was carried out by using a carboxylic acid type fluorinated cation exchange membrane prepared by hydrolyzing a copolymer of $C_2F_4$ and $CF_2 = CFO(CF_2)_3COOCH$ in the electrolytic cell The membrane had $A_1$ of 1.28 meq/g dry polymer. $A_2$ of 18.5 meq/gH$_2$O the glass transition temperature of 20° C and the thickness of 300 microns.

The electrolytic cell had an anode made of titanium coated with $RuO_2$ and a cathode made of stainless steel. (distance between electrodes of 5 mm) In the electrolysis, an aqueous solution of NaCl at 300 g/liter which was acidic by the addtion of HCl, as fed into the anolyte compartment and water was fed into the cathode compartment so as to obtain 40 % NaOH aq. solution. The electrolysis was carried out at 85° C under the current of 5 A and the current density of 20A/dm². The concentration of NaCl aq. solution overflowed from the anode compartment was 230 g/liter (NaCl), and the pH was 2.80. The oxygen content in the chlorine gas obtained from the anode compartment was 2.2 vol %. The cell voltage was 4.4 V and the current efficiency for producing 40 % NaOH aq. solution was 92.5 %. The amount of NaCl in the product of NaOH was 18 ppm.

EXAMPLES 8 to 11, and REFERENCES 5 to 6

In accordance with the process of Example 7, electrolysis was carried out by using a carboxylic acid type fluorinated cation exchange membrane prepared by hydrolyzing a copolymer of $C_2F_4$ and $CF_2 = CFO(CF_2)_3$ COOCH$_3$.

The results are shown in Table 6. The concentration and pH of NaCl aq. solution was controlled by varying the feeding rate of the NaCl aq. solution and the amount of HCl.

Table 6

| Exp. or Ref. | Exp. 8 | Exp. 9 | Exp. 10 | Exp. 11 | Ref. 5 | Ref. 6 |
|---|---|---|---|---|---|---|
| $A_1$ (meq/g) | 1.28 | 1.28 | 1.28 | 1.15 | 1.28 | 1.28 |
| $A_2$ (meq/g) | | | | | | |
| Glass transition temp. (° C) | 20 | 20 | 14 | 31 | 20 | 20 |
| NaCl aq. sol. Concentration (g/l) | 230 | 181 | 180 | 185 | 230 | 183 |
| pH | 2.10 | 2.05 | 1.85 | 1.60 | 4.21 | 0.90 |
| Cell voltage (V) | 4.4 | 4.2 | 4.2 | 4.5 | 4.2 | 5.0 |
| $O_2$ concentration in $Cl_2$ (%) | 1.8 | 1.8 | 1.5 | 1.4 | 3.5 | 1.0 |
| Concentration of NaOH (%) | 40 | 40 | 40 | 40 | 40 | 40 |
| Current efficiency for producing NaOH (%) | 92.3 | 93.0 | 93.5 | 91.8 | 92.0 | 91.0 |
| Concentration of NaCl in NaOH (ppm) | 17 | 21 | 20 | 12 | 21 | 23 |

EXAMPLE 12

In accordance with the process of Example 7, the electrolysis was carried out by using a carboxylic acid type fluorinated cation exchange membrane prepared by hydrolyzing a copolymer of $C_2F_4$ and $CF_2 = CFOCF_2CF(CF_3)OCF_2CF_2COOCH_3$.

The membrane had $A_1$ of 1.2 meq/g dry polymer, $A_2$ of 14.3 meq/gH$_2$O, the glass transition temperature of 5° C and the thickness of 200 microns. In the electrolysis, water was fed into the anolyte compartment so as to produce NaOH having the concentration of 300 g/liter. The electrolysis was carried out at 85° C under the current 5A and the current density of 20A/dm². The concentration of NaCl aq. solution overflowed from the anode compartment was 185 g/liter (NaCl) and the pH was 2.32. The oxygen gas content in chlorine gas was 1.9 vol %. the cell voltage was 4.0 V and the current efficiency for producing 40 % NaOH was 90.1 % and the concentration of NaCl in NaOh was 28 ppm.

EXAMPLE 13

An electrolysis of an aqueous solution of KCl was carried out by using the fluorinated cation exchange membrane ($A_1$: 1.28 meq/g dry polymer, $A_2$: 23.6 meq/gH$_2$ O) and the electrolytic cell of Example 7. In the electrolysis, an aqueous solution of KCl at the concentration of 270g/liter which was acidic with HCl, was fed into the anode compartment and water was fed into the catholyte compartment so as to form 40 % KOH. The electrolysis was carried out at 85° C under the current of 5A and the current density of 20A/dm². The concentration of KCl aq. solution overflowed from the anode compartment was 155g/liter (KCl) and pH was 2.62. The oxygen content in chlorine gas was 2.0 vol % and the cell voltage was 4.3 V, the current efficiency for producing 40 % KOH was 94.3 % and the concentration of KCl in KOH was 35 ppm.

What is claimed is:

1. In a process for producing an alkali metal hydroxide which comprises electrolysis of an aqueous solution of an alkali metal chloride in an electrolytic cell having an anode compartment and a cathode compartment which are partitioned by a fluorinated cation exchange membrane, the improvement which comprises a fluorinated cation exchange membrane made of a fluorinated copolymer having carboxylic acid groups as the ion exchange group and having an ion exchange capacity of 0.5 to 2.0 meq/g dry polymer and concentration of carboxylic acid groups of 8 to 30 meq/g water absorbed by the membrane when contacted with an aqueous solution of the alkali metal hydroxide having about the same concentration of alkali metal hydroxide as that of catholyte during said electrolysis.

2. The process of claim 1 wherein the fluorinated cation exchange membrane is a fluorinated copolyer which has two type units of

  a and

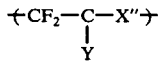  b where X represents —F, —Cl, —H or —CF$_3$; X' and X" respectively represent —F, —Cl, —H, —CF$_3$ or CF$_3$(CF$_2$)$_m$—; $m$ is 1 to 5; Y represents —A, —$\phi$—A, —P —A, —O ,13 (CF$_2$)$_n$(P, Q, R —A, wherein at least one of P, Q, and R are present and P represents —CF$_2$-)$_a$(CXX')$_b$(CF$_2$)$_c$; Q represents —CF$_2$—O —CXX')$_d$; R represents —(CXX'—O —CF$_2$)$_e$ and $\phi$ represents a phenylene group; X and X' are defined above; n is 0 or 1 ; $a, b, c, d,$ and $e$ respectively 0 to 6 ; A represents —COOH or a functional group which can be coverted to —COOH and comprises —CN, —COF, —COOR$_1$, —COOM, —CONR$_2$R$_3$; R$_1$ represent a C$_{1-10}$ alkyl group; M represents an alkali metal or a quaternary ammonium group and R$_2$ and R$_3$ respectively represent hydrogen atom or a C$_{1-10}$ alkyl group.

3. The process of claim 2 wherein Y of the unit (b) is selected from the group consisting of

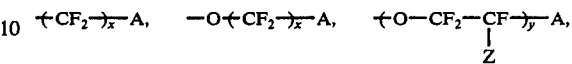

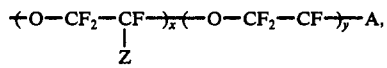

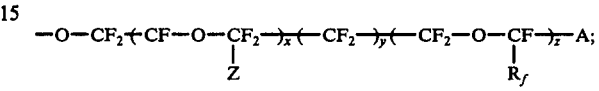

wherein x, y and z respectively 1 to 10; Z and R$_f$ respectively represent —F and a C$_{1-10}$ perfluoroalkyl group A is defined above.

4. The process of claim 2 wherein the content of the unit (b) is 1 to 40 mole % .

5. The process of claim 1 wherein water is fed in the cathode compartment to maintain the concentration of the alkali metal hydroxide in a range of 20 to 45 wt. % and the temperature in the electrolysis is maintained at 70° C to 120° C.

6. The process of claim 5, wherein the fluorinated copolymer as the methyl ester derivative has a volumetric melt flow rate of 100 mm³/second at 150° to 300° C.

7. The process of claim 1 wherein the fluorinated copolymer is produced by copolymerizing a fluorinated olefin and a comonomer having carboxylic acid group or a functional group which can be converted to carboxylic acid group.

8. The process of claim 1 wherein the fluorinated copolymer has a glass transition temperature which is at least 20° C lower than the temperature of the electrolysis.

9. The process of claim 1 wherein the electrolysis is performed at an acid pH greater than 1.3 in the anolyte by adding an acid in the anode compartment.

10. The process of claim 4, wherein the content of unit (b) is 3 to 20 mole %.

* * * * *

REEXAMINATION CERTIFICATE (197th)
United States Patent [19]

Oda et al.

[11] B1 4,065,366

[45] Certificate Issued    May 22, 1984

[54] PROCESS FOR PRODUCING ALKALI METAL HYDROXIDE

[75] Inventors: Yoshio Oda; Manabu Suhara; Eiji Endo, all of Yokohama, Japan

[73] Assignee: Asahi Glass Co., Ltd., Tokyo, Japan

Reexamination Request:
No. 90/000,121, Dec. 3, 1981

Reexamination Certificate for:
Patent No.: 4,065,366
Issued: Dec. 27, 1977
Appl. No.: 728,017
Filed: Sep. 29, 1976

[30] Foreign Application Priority Data

Oct. 17, 1975 [JP]    Japan ................... 50-124275

[51] Int. Cl.$^3$ ............ C25B 1/16; C25B 1/26; C25B 13/08
[52] U.S. Cl. ............................ 204/98; 204/128; 204/296
[58] Field of Search ................. 204/98, 128, 296; 260/348.48

[56] References Cited

U.S. PATENT DOCUMENTS

| | | | |
|---|---|---|---|
| 3,220,941 | 11/1965 | Osborne | 208/98 |
| 3,506,635 | 4/1970 | Anderson | 260/348.48 |
| 3,546,186 | 12/1970 | Gladding et al. | 260/80.73 |
| 3,657,104 | 4/1972 | Hodgdon | 204/296 |
| 3,887,499 | 6/1975 | Hodgdon | 204/296 |
| 3,904,496 | 9/1975 | Harke et al. | 204/98 |
| 3,954,579 | 5/1976 | Cook et al. | 204/98 |
| 4,025,405 | 5/1977 | Dotson et al. | 204/98 |
| 4,178,218 | 12/1979 | Seko | 204/98 |

FOREIGN PATENT DOCUMENTS 2510071   9/1975   Fed. Rep. of Germany .

*Primary Examiner*—R. L. Andrews

[57]    ABSTRACT

In a process for producing an alkali metal hydroxide which comprises electrolysis of an aqueous solution of an alkali metal chloride in an electrolytic cell having an anode compartment and a cathode compartment which are partitioned by a fluorinated cation exchange membrane, the improvement which comprises a fluorinated cation exchange membrane made of a fluorinated copolymer having carboxylic acid groups as the ion exchange group and having an ion exchange capacity of 0.5 to 2.0 meq/g dry polymer and a concentration of carboxylic acid groups of 8 to 30 meq/g water absorbed by the membrane when contacted with an aqueous solution of the alkali metal hydroxide having about the same concentration of alkali metal hydroxide as that of catholyte during said electrolysis.

REEXAMINATION CERTIFICATE ISSUED UNDER 35 U.S.C. 307.

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-10 is confirmed.

New claims 11-14 are added and determined to be patentable.

*11. The process of claim 1 wherein the fluorinated copolymer has an ion exchange capacity of 0.9 to 1.8 meq/g dry polymer.*

*12. The process of claim 1 wherein the fluorinated copolymer has an ion exchange capacity of 1.1 to 1.7 meq/g dry polymer.*

*13. The process of claim 1 wherein the concentration of carboxylic acid groups is 10 to 28 meq/g water absorbed by the membrane when contacted with an aqueous solution of alkali metal hydroxide having about the same concentration of alkali metal hydroxide as that of the catholyte during said electrolysis.*

*14. The process of claim 1 wherein the concentration of carboxylic acid groups is 14 to 26 meq/g water absorbed by the membrane when contacted with an aqueous solution of alkali metal hydroxide having about the same concentration of alkali metal hydroxide as that of the catholyte during said electrolysis.*

* * * * *